United States Patent
Yildiz et al.

(10) Patent No.: US 9,928,105 B2
(45) Date of Patent: Mar. 27, 2018

(54) STACK OVERFLOW PREVENTION IN PARALLEL EXECUTION RUNTIME

(75) Inventors: Huseyin S. Yildiz, Kenmore, WA (US); John J. Duffy, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 983 days.

(21) Appl. No.: 12/824,331

(22) Filed: Jun. 28, 2010

(65) Prior Publication Data
US 2011/0321059 A1    Dec. 29, 2011

(51) Int. Cl.
| | | |
|---|---|---|
| G06F 11/14 | (2006.01) | |
| G06F 11/20 | (2006.01) | |
| G06F 9/48 | (2006.01) | |
| G06F 11/00 | (2006.01) | |
| G06F 11/07 | (2006.01) | |
| G06F 9/455 | (2018.01) | |

(52) U.S. Cl.
CPC ........ *G06F 9/4843* (2013.01); *G06F 9/45504* (2013.01); *G06F 11/004* (2013.01); *G06F 11/0751* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 5,950,221 A | * | 9/1999 | Draves et al. ................. | 711/100 |
| 6,009,499 A | * | 12/1999 | Koppala ............. | G06F 12/0875 |
| | | | | 711/132 |
| 6,038,643 A | * | 3/2000 | Tremblay ............ | G06F 9/30021 |
| | | | | 711/132 |
| 6,131,144 A | * | 10/2000 | Koppala ........................ | 711/132 |
| 6,578,094 B1 | * | 6/2003 | Moudgill ........................ | 710/57 |
| 6,658,578 B1 | | 12/2003 | Laurenti et al. | |
| 6,904,513 B1 | | 6/2005 | Tormey et al. | |
| 7,178,002 B2 | * | 2/2007 | Boucher ........................ | 711/170 |
| 7,788,536 B1 | * | 8/2010 | Qureshi et al. ............ | 714/38.14 |
| 8,234,476 B2 | * | 7/2012 | Ono et al. ..................... | 711/163 |

(Continued)

OTHER PUBLICATIONS

Crandall, "Minos: Control Data Attack Prevention Orthogonal to Memory Model", 2004, IEEE, 1072-4451/04.*

(Continued)

*Primary Examiner* — Charles E Anya
*Assistant Examiner* — Phuong N Hoang
(74) *Attorney, Agent, or Firm* — Dicke, Billig & Czaja, PLLC

(57) ABSTRACT

A parallel execution runtime prevents stack overflow by maintaining an inline counter for each thread executing tasks of a process. Each time that the runtime determines that inline execution of a task is desired on a thread, the runtime determines whether the inline counter for the corresponding thread indicates that stack overflow may occur. If not, the runtime increments the inline counter for the thread and allows the task to be executed inline. If the inline counter indicates a risk of stack overflow, then the runtime performs additional one or more checks using a previous stack pointer of the stack (i.e., a lowest known safe watermark), the current stack pointer, and memory boundaries of the stack. If the risk of stack overflow remains after all checks have been performed, the runtime prevents inline execution of the task.

17 Claims, 4 Drawing Sheets

(56) References Cited

U.S. PATENT DOCUMENTS

| | | | |
|---|---|---|---|
| 8,510,596 B1* | 8/2013 | Gupta et al. ............... 714/15 |
| 2003/0121030 A1* | 6/2003 | Koob et al. ............... 717/152 |
| 2004/0034742 A1 | 2/2004 | Field et al. |
| 2004/0088720 A1 | 5/2004 | Nistler et al. |
| 2004/0123185 A1* | 6/2004 | Pierce et al. ............... 714/38 |
| 2004/0139441 A1* | 7/2004 | Kaburaki et al. ........... 718/107 |
| 2004/0143824 A1* | 7/2004 | Sarcar ............... G06F 9/4425 717/145 |
| 2005/0044327 A1* | 2/2005 | Howard et al. ............... 711/147 |
| 2007/0282928 A1 | 12/2007 | Jiao et al. |
| 2008/0140979 A1 | 6/2008 | Kim et al. |
| 2008/0168460 A1* | 7/2008 | Lee et al. ............... 718/104 |
| 2009/0259702 A1 | 10/2009 | Stephens et al. |
| 2010/0299668 A1* | 11/2010 | Venkumahanti et al. .... 718/102 |

OTHER PUBLICATIONS

Salamat, et al., "Stopping Buffer Overflow Attacks at Run-Time: Simultaneous Multi-Variant Program Execution on a Multicore Processor", Retrieved at << http://www.babaks.com/files/TechReport-07-13.pdf >>, Technical Report, No. 07-13, Dec. 4, 2007, pp. 26.
Cowan, et al., "StackGuard: Automatic Adaptive Detection and Prevention of Buffer-Overflow Attacks", Retrieved at << http://www.usenix.org/publications/library/proceedings/sec98/full_papers/cowan/cowan.pdf >>, Proceedings of the 7th USENIX Security Symposium, Jan. 26-29, 1998, pp. 16.
Leijen, et al., "The Design of a Task Parallel Library", Retrieved at << http://research.microsoft.com/pubs/77368/TheDesignOfATaskParallelLibrary%28draft2008%29.pdf >>, Aug. 18, 2008, pp. 1-10.
"Watcom C/C++ User's Guide", Retrieved at << http://download.sybase.com/pdfdocs/wtc1100e/cuserguide.pdf >>, Retrieved Date: Oct. 30, 2009, pp. 674.
Erlingsson, et al., "XFI: Software Guards for System Address Spaces", Retrieved at << http://www.usenix.org/event/osdi06/tech/full_papers/erlingsson/erlingsson_html/index.html >>, Operating Systems Design and Implementation, Proceedings of the 7th USENIX Symposium on Operating Systems Design and Implementation, vol. 7, Nov. 6-8, 2006, pp. 16.
International Preliminary Report on Patentability for International Application No. PCT/US2011/040068, dated Jan. 10, 2013 (6 pages).
Yi Guo et al., "SLAW: A Scalable Locality-Aware Adaptive Work-Stealing Scheduler," IEEE International Symposium on Parallel & Distributed Processing (IPDPS), pp. 12 (Apr. 19, 2010).
Lingli Zhang et al., "Language and Virtual Machine Support for Efficient Fine-Grained Futures in Java," IEEE 16th International Conference on Parallel Architecture and Compilation (PACT), pp. 10 (Sep. 1, 2007).
Ganesh Bikshandi et al., "Efficient, Portable Implementation of Asynchronous Multi-Place Programs," Symposium on Principles and Practice of Parallel Programming, pp. 12 (Feb. 14-18, 2009).
"International Search Report and Written Opinion", dated Jan. 16, 2012, Application No. PCT/US2011/040068, Filed Date: Jun. 10, 2011, pp. 9.

* cited by examiner

STACK OVERFLOW PREVENTION IN PARALLEL EXECUTION RUNTIME

BACKGROUND

Computer systems include memory that is used to store information (i.e., instructions and data) that is used by the computer system. An operating system that is booted and executed by computer system typically manages the memory. Some operating systems manage the memory as stacks with designated sizes that are provided to processes of the computer system. In such systems, the stack is generally managed to attempt to prevent stack overflows (i.e., exceeding the size limits of stacks).

With sequential processes, scenarios that may cause stack overflow, such as a deep nest of called functions, recursive functions, and functions with large numbers of stack variables, may be easy to recognize and prevent. As computer systems develop the ability to execute different parts of the same process (e.g., different tasks) concurrently, however, the detection of stack overflow may become much more complex. As a result, computer systems that enable concurrent execution of different parts of the same process may have a higher risk for stack overflow or may have a greater performance impact in preventing stack overflows.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A parallel execution runtime prevents stack overflow by maintaining an inline counter for each thread executing tasks of a process. Each time that the runtime determines that inline execution of a task is desired on a thread, the runtime determines whether the inline counter for the corresponding thread indicates that stack overflow may occur. If not, the runtime increments the inline counter for the thread and allows the task to be executed inline. If the inline counter indicates a risk of stack overflow, then the runtime performs additional one or more checks using a previous stack pointer of the stack (i.e., a lowest known safe watermark), the current stack pointer, and memory boundaries of the stack. If the risk of stack overflow remains after all checks have been performed, the runtime prevents inline execution of the task.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
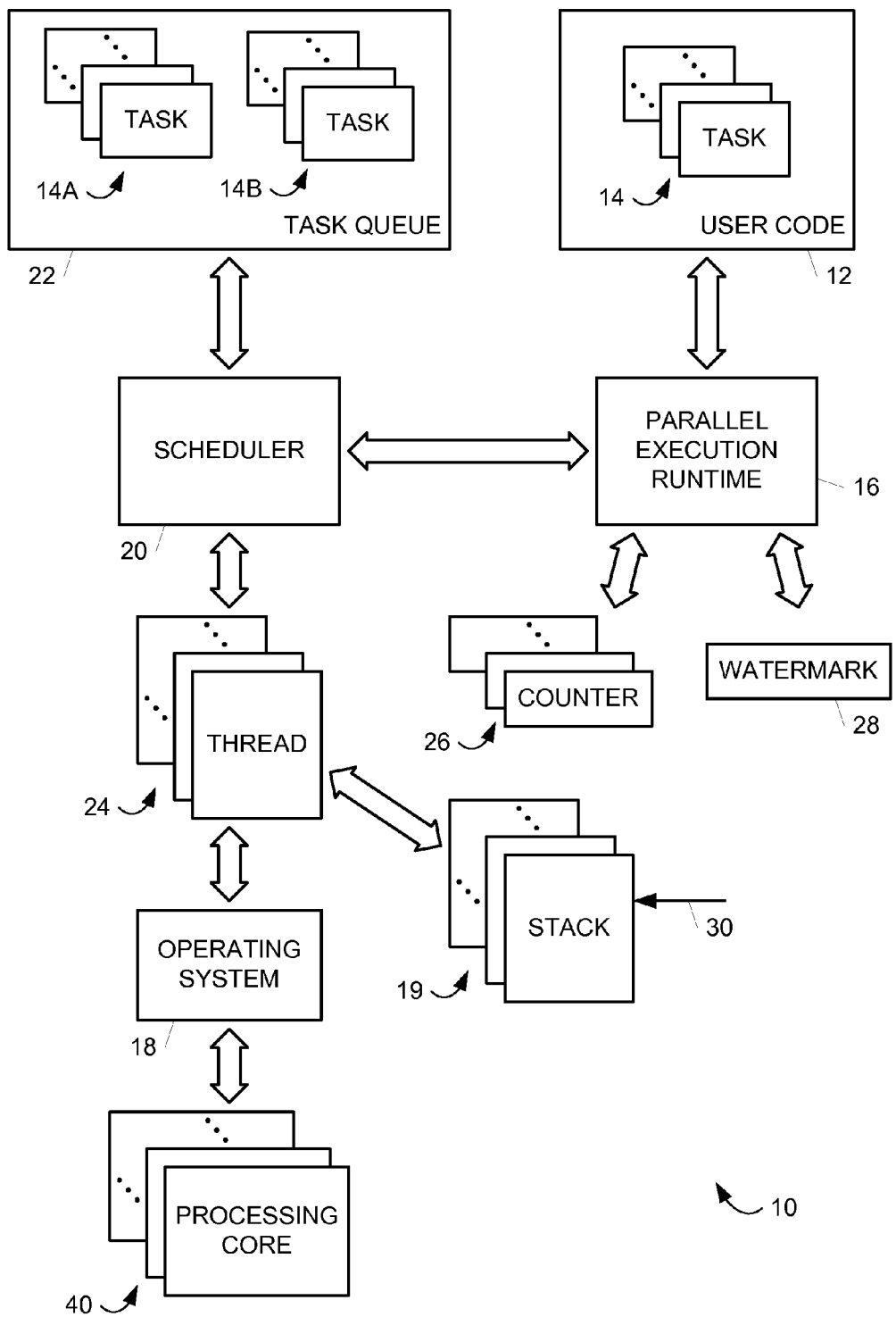
FIG. 1 is a block diagram illustrating an embodiment of a parallel execution runtime environment with stack overflow prevention.

FIG. 1 is a block diagram illustrating an embodiment of a parallel execution runtime environment 10 with stack overflow prevention. Runtime environment 10 represents a runtime mode of operation in a computer system, such as a computer system 100 shown in FIG. 5 and described in additional detail below, where the computer system is executing instructions on a set of one or more processing cores 40 of the computer system. Runtime environment 10 includes invoked user code 12, parallel execution runtime 16 (hereafter referred to as runtime 16), an operating system (OS) 18, at least one scheduler 20 with a corresponding task queue 22, and a set of one or more threads of execution 22 with corresponding stacks 19. Runtime environment 10 allows tasks from a set of tasks 14 of user code 12 to be executed, along with tasks from any other processes that co-exist with user code 12 (not shown), using runtime 16, OS 18, scheduler 20, threads 24, and processing cores 40.

User code 12 includes a sequence of instructions where at least a portion of the sequence is sub-divided into tasks 14. User code 12 causes tasks 14 to be scheduled for execution on processing cores 40 by scheduler 20 using runtime 16. In one embodiment, user code 12 calls an application program interface (API) 42 in runtime 16 to provide the task 14 to a scheduler 20. In other embodiments, user code 12 uses other programming language constructs and/or corresponding tools provided by runtime 16 to provide a task 14 to a scheduler 20 using runtime 16. User code 12 may also cancel or attempt to cancel tasks 14 by notifying runtime 16 and may receive notification from the runtime 16 regarding the status of cancelled tasks 14.

Each task 14 includes a sequence of instructions that perform a unit of work when executed by a processing core 40. Tasks 14 are coded such that one or more tasks 14 may be scheduled for concurrent execution by processing cores 40 and/or executed concurrently by processing cores 40.

Tasks 14 may include dependencies that cause the execution of certain tasks 14 to block (i.e., yield control to other threads 24) and wait until the execution of one or more other tasks 14 completes before resuming and completing the execution of the blocked tasks 14. During execution, each task 14 may generate additional tasks 14 that may be added to scheduler 20. Each task 14 may also cancel other tasks 14 in scheduler 20.

User code 12 may represent any suitable type of code, such as an application, a library function, or an operating system service. User code 12 has a program state and machine state associated with a set of allocated resources of the computer system that include a defined memory address space. User code 12 executes autonomously or substantially autonomously from any co-existing processes in runtime environment 10. Accordingly, user code 12 does not adversely alter the program state of co-existing processes or the machine state of any resources allocated to co-existing processes. Similarly, co-existing processes do not adversely alter the program state of user code 12 or the machine state of any resources allocated to user code 12.

Runtime 16 allows tasks 14 to be executed concurrently in runtime environment 10. Runtime 16 manages the execution of tasks 14 including task initialization, task status, task waiting, task cancellation, task continuations, and task exception handling. Runtime 16, however, allows scheduler 20 to control the implementation of task queuing, dispatch, and thread management. Runtime 16 receives tasks 14 from user code 12 and initializes the tasks 14 to generate task specific state variables used to manage the status of tasks 14. Runtime 16 invokes tasks 14 for execution in response to requests from scheduler 20. In invoking tasks 14 for execution, runtime 16 maintains the status of tasks 14, handles task waiting, identifies tasks 14 that may be executed inline on threads 24 as continuations, cancels tasks 14, and handles exceptions generated by tasks 14.

OS 18 manages processing and other resources of the computer system and provides a set of functions that allow user code 12, runtime 16, scheduler 20, threads 24, and other processes in the computer system to access and use the components. In addition, OS 18 allocates memory from a memory system, such as a memory system 104 shown in FIG. 5 and described in additional detail below, to user code 12, runtime 16, scheduler 20, threads 24, and other processes in the computer system. OS 18 may allocate memory from the memory system in any suitable fixed or variable sizes. OS 18 allocates memory to user code 12 by creating a stack 19 for each thread 24 and allowing code running on a thread 24 to exclusively access and use memory blocks from the corresponding stack 19.

Scheduler 20 is configured to schedule tasks 14 provided from user code 12 for execution by threads 24 on processing cores 40. Scheduler 20 operates to schedule provided tasks 14 for concurrent execution using runtime 16 in any suitable way. Scheduler 20 maintains task queue 22 of tasks 14 and dispatches tasks 14 according to a scheduling algorithm. Task queue 22 forms any suitable collection of tasks 14 that are arranged in any suitable dispatch order. For example, task queue 22 may be organized into a synchronized collection (e.g., a stack and/or a queue) for logically independent tasks 14 along with a list of workstealing queues for independent and/or dependent tasks 14. The tasks 14 in task queue 22 include a set of one or more tasks 14A that are executing or waiting to be dispatched for execution (e.g., new tasks 14 and unblocked tasks 14) and a set of one or more tasks 14B that are blocked. The scheduling algorithm may be any suitable type of dispatch loop that dispatches tasks 14 from the task queue 22 for execution in an order determined by any suitable criteria.

Scheduler 20 obtains access to threads 24 in any suitable way, such as by requesting threads 24 from OS 18 and/or runtime 16 or by delegating thread management to another execution entity such as another scheduler (not shown) or other user code (not shown). Each thread 24 forms a conventional thread, fibre (i.e., a lightweight thread), or analogous OS concept such as a child process that executes associated tasks 14 and other instructions on processing cores 40. Each thread 24 has a corresponding stack 19 that maintains program state and machine state information for the thread 24.

When a thread 24 is available to scheduler 20, scheduler 20 selects a task 14A and provides the task 14A to runtime 16 for execution by the thread 24. The thread 24 executes the task 14 to completion, a blocking point, or other interruption (e.g., an explicit yield or a forced preemption). Upon completion of a task 14A on a thread 24, the thread 24 becomes available to execute another task 14A from scheduler 20. A task 14 executing on a thread 24 may unblock other tasks 14B previously dispatched for execution by the scheduler 20 by generating data, a message, or an event, for example, which will be used by a blocked task 14B. Scheduler 20 continues to execute tasks 14 with threads 24 until all tasks 14 of the scheduler 20 have been executed.

Processing cores 40 reside in a set or one or more processor packages (e.g., processor packages 102 shown in FIG. 5 and described in additional detail below) of the computer system. Each processing core 40 is configured to execute instructions independently or substantially independently from the other processing cores 40 and includes a machine state. Processing cores 40 may be included in a single processor package or may be distributed across multiple processor packages.

Runtime 16 includes a task wait API that allows a thread 24 to halt the execution of one task 14 until another task 14 (i.e., a called task 14) completes execution. Runtime 16 may allow the thread 24 that calls the task wait API (i.e., the calling thread) to execute the called task 14 or may cause the thread 24 to block until another thread 24 executes the called task 14. By implementing the task wait API, however, runtime 16 may open up the possibility of overflows of stacks 19 which are not directly controllable by user code 12. In particular, when a task 14 is executed inline on a thread 24, the stack 19 of the thread 24 expands temporarily to accommodate the state associated with the execution of the called task 14. If a group of tasks 14 wait on one another in such a way that causes a long chain of task inlines on the same thread 24, the stack 19 may expand beyond its pre-allocated limits resulting in a stack overflow and force OS 18 to terminate the thread 24.

Runtime 16 allows inline execution of tasks 14 (i.e., execution of a task 14 on a caller thread 24) while preventing stack overflow of stack 19 from occurring. Inline execution may occur when a called task 14A in scheduler 20 is executed on a calling thread 24 that initiates a task wait on the called task 14, when runtime 16 executes task continuations, when certain task properties are accessed, or when user code 12 specifically requests that an unstarted task 14 be run inline from within the body of another task 14, for example. The thread 24 either executes the called task 14 inline or otherwise waits until the called task 14 is executed by another thread 24. When runtime 16 decides to execute a task 14 inline, runtime 16 causes the task 14 to be executed on the calling thread 24 (i.e., the thread 24 that initiated the task wait).

Runtime 16 prevents stack overflow of stack 19 from occurring as a result of inlining tasks by maintaining an inline counter 26 for each thread 24 executing tasks 14 of user code 12. Each time that runtime 16 determines that inline execution of a task is desired on a thread 24, runtime 16 determines whether the inline counter 26 for the corresponding thread 24 indicates that stack overflow may occur. If not, runtime 16 increments the inline counter 26 for the thread 24 and allows the task 14A to be executed inline. If the inline counter 26 indicates a risk of stack overflow, then runtime 16 performs one or more additional checks using a previous stack pointer of stack 19 (i.e., a lowest known safe watermark 28), a current stack pointer 30 of stack 19, and memory boundaries of the stack 19 obtained from OS 18. If the risk of stack overflow remains after all checks have been performed, runtime 16 prevents inline execution of the task 14A and causes the task 14 to be executed by another thread 24.

Figure 2:
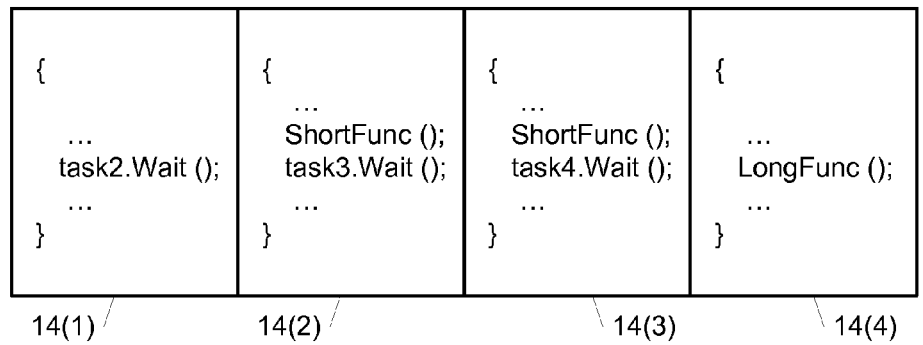
FIG. 2 is a block diagram illustrating an example of inlining tasks.

Runtime 16 maintains an inline counter 26 by incrementing the inline counter 26 each time that a task 14 is executed inline on a corresponding thread 24 and by decrementing the inline counter 26 each time that an inlined task 14 returns as shown in FIG. 2.

Figure 3:
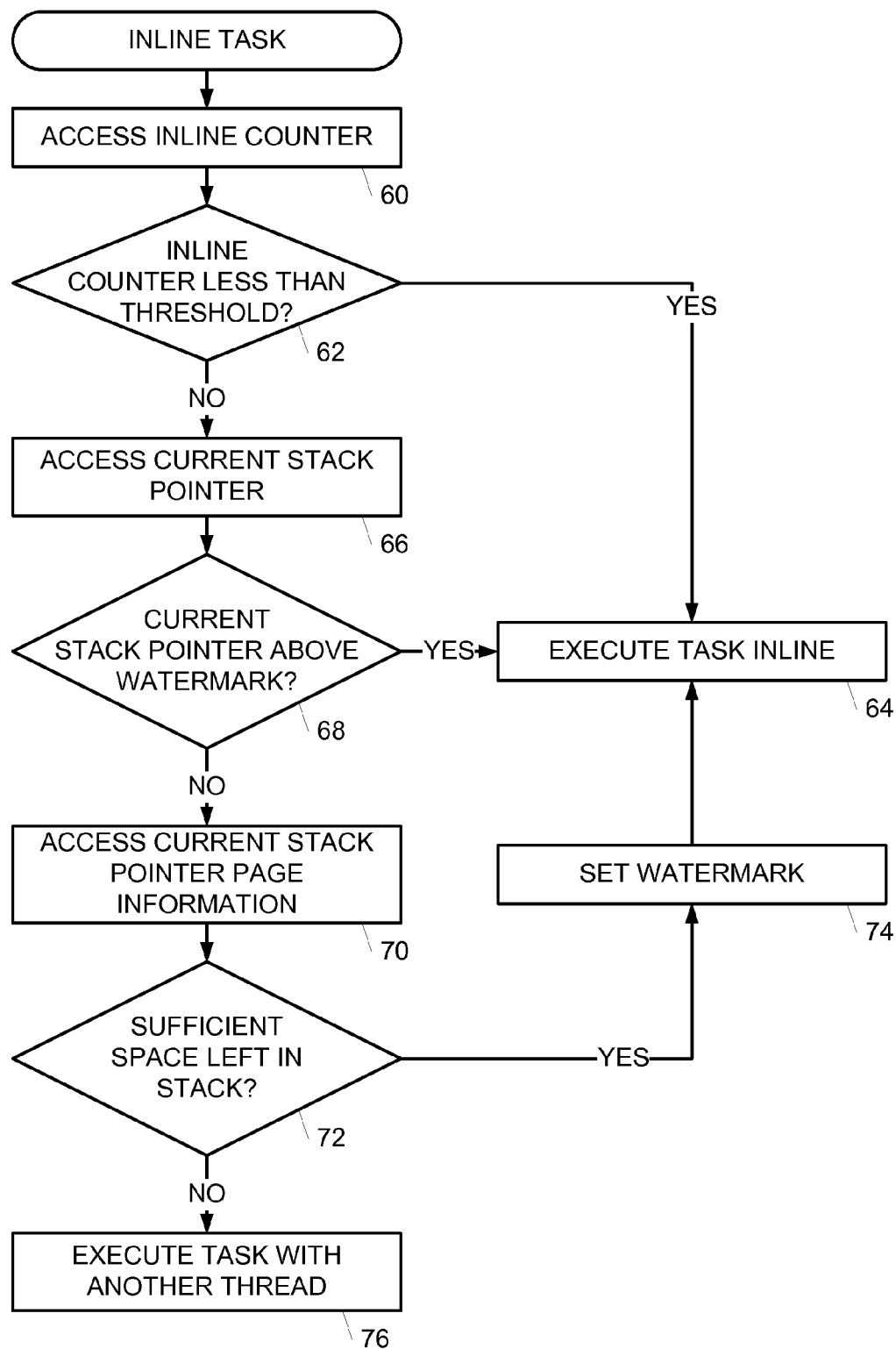
FIG. 3 is a flow chart illustrating an embodiment of a method for preventing stack overflow.

FIG. 2 is a block diagram illustrating an example of inlining tasks 14(1)-14(4). In the example of FIG. 2, a task 14(1) executing on a thread 24 calls another task 14(2) (i.e., task2) and blocks as designated by. Wait. Runtime 16 increments the corresponding inline counter 26 (e.g., from zero to one) in response to the calling thread 24 picking up task 14(2). Task 14(2) executes a function ShortFunc, calls another task 14(3) (i.e., task3), and blocks as designated as designated by. Wait. Runtime 16 again increments the corresponding inline counter 26 (e.g., from one to two) in response to the calling thread 24 picking up task 14(3). Task 14(3) also executes the function ShortFunc, calls another task 14(4) (i.e., task4), and blocks as designated as designated by. Wait. Runtime 16 increments the corresponding inline counter 26 (e.g., from two to three) as shown in FIG. 3 in response to the calling thread 24 picking up task 14(4). Task 14(4) executes a function LongFunc.

Assuming that task 14(4) completes, runtime 16 decrements the inline counter 26 (e.g., from three to two) when task 14(4) returns and unblocks task 14(3). Likewise, runtime 16 decrements the inline counter 26 (e.g., from two to one) when task 14(3) returns and unblocks task 14(2). Runtime 16 further decrements the inline counter 26 (e.g., from one to zero) when task 14(2) returns and unblocks task 14(1).

Figure 4:
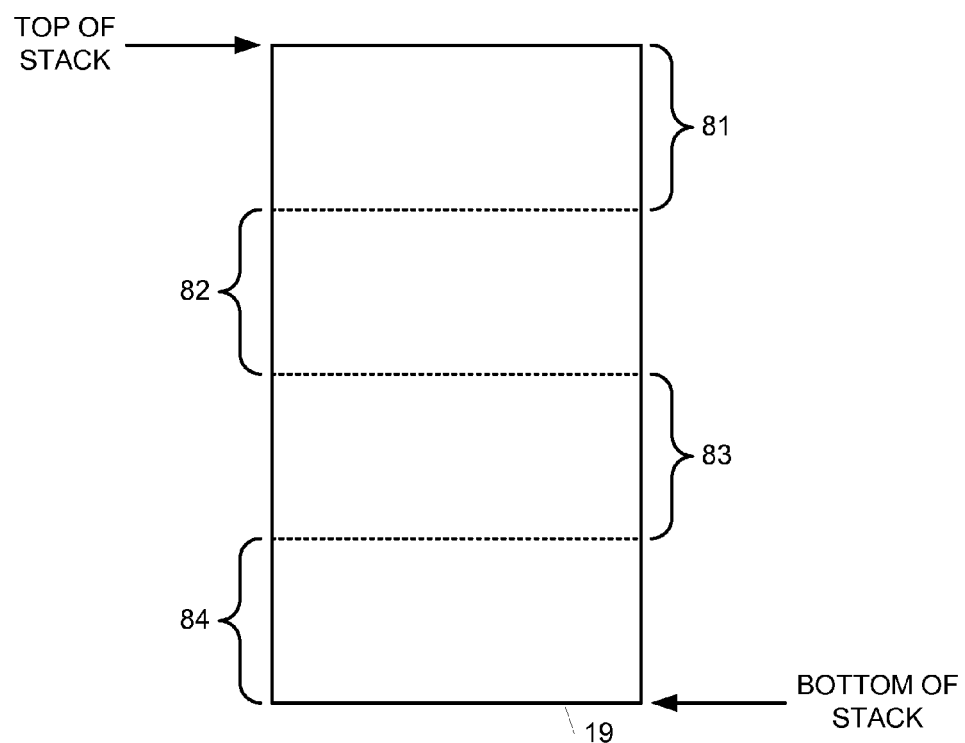
FIG. 4 is a block diagram illustrating an embodiment of a stack.

FIG. 3 is a flow chart illustrating an embodiment of a method for preventing stack overflow, and FIG. 4 is a block diagram illustrating an embodiment of a stack. Runtime 16 implements the method according to one embodiment any time that runtime 16 detects that inline execution of a task 14 by a thread 24 (i.e., the calling thread 24) is desired. The embodiment of FIG. 3 will be described with reference to FIGS. 1 and 4.

In FIG. 3, runtime 16 accesses an inline counter 26 corresponding to the calling thread 24 as indicated in a block 60. Runtime 16 determines whether the inline counter 26 is less than a threshold (e.g., 100) as indicated in a block 62. If so, then runtime 16 concludes that the task 14 may be executed inline without causing stack 19 to overflow and executes task 14 inline as indicated in a block 64. If the inline counter 26 is less than the threshold, then runtime 16 determines that stack 19 will not overflow. As shown in FIG. 4, runtime 16 determines the fill depth of stack 19 to be in a region 81 between the top of stack 19 and an estimation of the fill depth of stack 19 that corresponds to the threshold.

If the inline counter 26 is not less than the threshold, then runtime 16 accesses the current stack pointer 30 of stack 19 as indicated in a block 66 and determines whether the current stack pointer 30 is above a lowest known safe watermark 28 (i.e., a previous stack pointer) as indicated in a block 68. Because the access of the current stack pointer 30 by runtime 16 may have a significant execution impact in some embodiments, runtime 16 maintains the lowest known safe watermark 28. The lowest known safe watermark is the deepest position in stack 19 (i.e., a previous stack pointer) encountered so far by runtime 16 that has been verified to be far enough from the end of the stack 19 to be safe. If the current stack pointer 30 is above watermark 28, then runtime 16 determines that the task 14 may be executed inline without causing stack 19 to overflow and executes task 14 inline as indicated in a block 64. As shown in FIG. 4, runtime 16 determines the fill depth of stack 19 to be in a region 82 between an estimation of the fill depth of stack 19 that corresponds to the counter threshold and watermark 28 (i.e., a previous stack pointer verified to be far enough from the end of the stack 19 to be safe).

The lowest known safe watermark 28 is initially set to a value (e.g., zero or the top of the stack) that will cause the current stack pointer 30 not to be above the lowest known safe watermark 28 the first time that the function of block 68 is performed. As a result, the first comparison in block 68 will cause the functions of blocks 70, 72, and 74 will be performed to set the watermark 28 to the current stack pointer 30 for subsequent stack overflow determinations using the method of FIG. 3.

If the current stack pointer 30 is not above a lowest known safe watermark 28 as determined in block 68, then runtime 16 accesses memory boundaries of stack pointer 30 from OS 18 as indicated in a block 70. Runtime 16 determines whether there is sufficient space left in stack 19 to execute the task 14 inline as indicated in a block 72. To do so, runtime 16 determines whether the amount of memory space in stack 19 between the memory boundaries and the stack pointer 30 is greater than a predetermined threshold.

If there is sufficient space left in stack 19 to execute the task 14 inline as determined in block 72, then runtime 16 sets watermark 28 to the value of the current stack pointer 30 as indicated in a block 74. Because runtime 16 compared the current stack pointer 30 to the memory boundaries of stack 19 in block 72, runtime 16 considers the current stack pointer 30 to be a known safe watermark. And because the current stack pointer 30 is lower than watermark 28, runtime 16 sets watermark 28 to the value of the current stack pointer 30 to store the current stack pointer 30 as the lowest known safe watermark 28.

If there is sufficient space left in stack 19 to execute the task 14 inline as determined in block 72, then runtime 16 executes task 14 inline as indicated in block 64. In this case, runtime 16 determines the fill depth of stack 19 to be in a region 83 between watermark 28 (i.e., a previous stack pointer) and the current stack pointer 30 as shown in FIG. 4.

If there is not sufficient space left in stack 19 to execute the task 14 inline as determined in block 72, then runtime 16 concludes that stack 19 may overflow and causes the task 14 to be executed with another thread as indicated in a block 76. Runtime 16 causes the calling thread 24 to remain blocked until the called task 14 completes execution on another thread 24. In this case, runtime 16 determines the fill depth of stack 19 to be in a region 84 between the current stack pointer 30 and the stack boundary (i.e., the bottom of the stack) as shown in FIG. 4.

Figure 5:
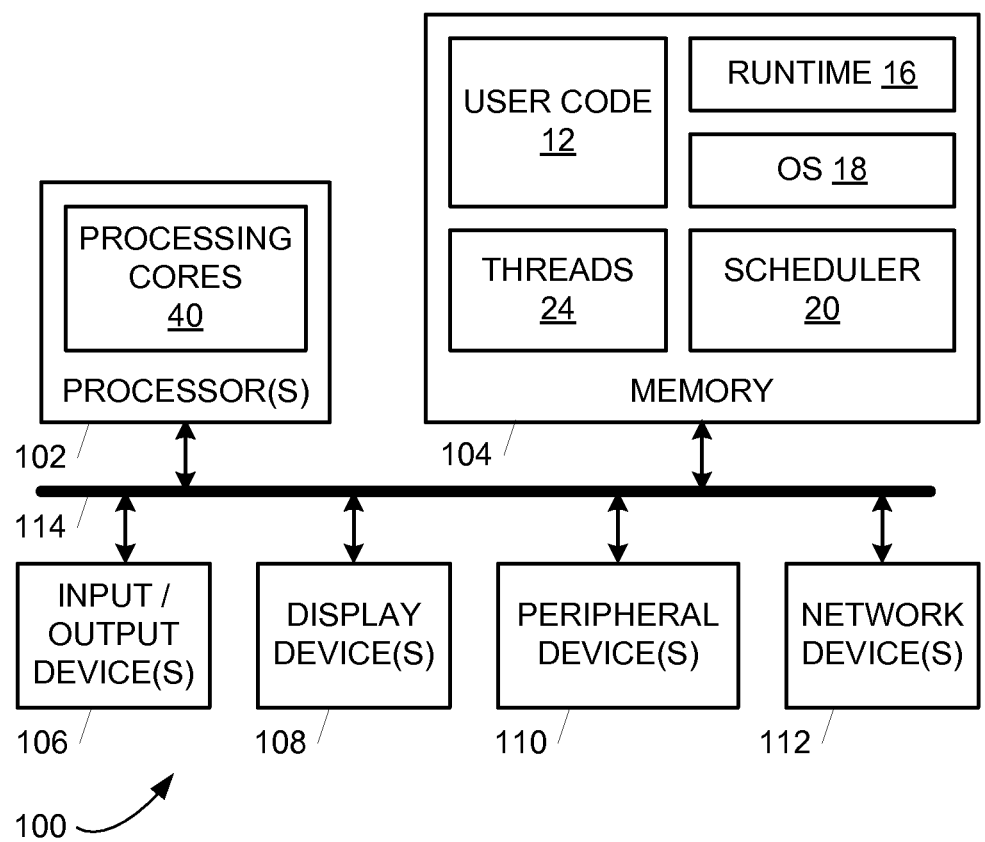
FIG. 5 is a block diagram illustrating an embodiment of a computer system configured to implement a parallel execution runtime environment with stack overflow prevention.

FIG. 5 is a block diagram illustrating an embodiment of computer system 100 which is configured to implement parallel execution runtime environment 10 (shown in FIG. 1) with stack overflow prevention as described above.

Computer system 100 includes one or more processor packages 102 that each include one or more processing cores 40, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone or smartphone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more processing cores 40 that form execution hardware configured to execute instructions (i.e., software). Each processor package 102 may include processing cores 40 with the same or different architectures and/or instruction sets. For example, the processing cores 40 may include any combination of in-order execution cores, superscalar execution cores, and GPGPU execution cores. Each processing core 40 in processor packages 102 is configured to access and execute instructions stored in memory system 104. The instructions may include a basic input output system (BIOS) or firmware (not shown), user code 12, runtime 16, OS 18, scheduler 20, and threads 24. Each processing core 40 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions (i.e., software) including user code 12, runtime 16, OS 18, scheduler 20, and threads 24. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of user code 12, runtime 16, OS 18, scheduler 20, and threads 24 described herein. Examples of storage devices in memory system 104 include hard disk drives, random access memory (RAM), read only memory (ROM), flash memory drives and cards, and magnetic and optical disks such as CDs and DVDs.

Computer system 100 boots and executes OS 18. OS 18 includes instructions executable by processor packages 102 to manage the components of computer system 100 and provide a set of functions that allow user code 12, runtime 16, OS 18, scheduler 20, and threads 24 to access and use the components. In one embodiment, OS 18 is the Windows operating system. In other embodiments, OS 18 is another operating system suitable for use with computer system 100. Runtime 16 includes instructions that are executable in conjunction with OS 18 to generate runtime environment 10 shown in FIG. 1 and provide runtime functions to user code 12 and scheduler 20. The runtime functions may be included as an integrated part of OS 18 or other programming entities and/or constructs in other embodiments.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a computer system, the method comprising:
   determining whether inline execution of a task on a first thread may cause a stack to overflow using a current stack pointer and a lowest known safe watermark, the determining performed by a runtime configured to allow the task to be executed concurrently with a set of other tasks from user code, the lowest known safe watermark is the deepest position in the stack by a previous stack pointer that was determined to be safe;
   preventing the task from being executed inline on the first thread in response to the determining that stack overflow may occur;
   in response to the determining that the current stack pointer and the lowest known safe watermark indicate that the inline execution may cause the stack to overflow, using the current stack pointer and a memory boundary of the stack to determine whether the inline execution will actually cause the stack to overflow; and executing the task inline on the first thread in response to determining that the current stack pointer and the memory boundary indicate that the inline execution will not cause the stack to overflow.

2. The method of claim 1 further comprising:

executing the task with a second thread in response to determining that inline execution of the task on the first thread may cause the stack to overflow; and blocking the first thread until the task completes execution on the second thread.

3. The method of claim 1 further comprising:

executing the task with the first thread in response to determining that inline execution of the task on the first thread will not cause the stack to overflow.

4. The method of claim 1 further comprising:

determining whether the inline execution of the task on the first thread may cause the stack to overflow using an inline counter corresponding to the first thread.

5. The method of claim 4 further comprising:

executing the task inline on the first thread in response to determining that the inline counter does not exceed a threshold; and incrementing the inline counter in response to the executing the task inline on the first thread.

6. The method of claim 5 further comprising:

decrementing the inline counter in response to the task returning from execution on the first thread.

7. The method of claim 1 further comprising:

determining whether the inline execution of the task on the first thread may cause the stack to overflow using a memory boundary of the stack queried from an operating system.

8. The method of claim 1 further comprising:

executing the task with a second thread in response to determining that the current stack pointer and the memory boundary indicate that the inline execution may cause the stack to overflow.

9. A method performed by a computer system, the method comprising:

maintaining an inline counter corresponding to a first thread that identifies a number of inline executions being performed by the first thread;

determining, with the inline counter, whether inline execution of a task on the first thread may cause a stack to overflow, the determining performed by a runtime configured to allow the task to be executed concurrently with a set of other tasks from user code;

determining, using a current stack pointer and a lowest known safe watermark, whether the inline execution of the task on the first thread may cause the stack to overflow, the lowest known safe watermark is the deepest position in the stack by a previous stack pointer that was determined to be safe;

preventing the task from being executed inline on the first thread in response to the determining that stack overflow may occur;

in response to the determining that the current stack pointer and the lowest known safe watermark indicate that the inline execution may cause the stack to overflow, using the current stack pointer and a memory boundary of the stack to determine whether the inline execution will actually cause the stack to overflow; and executing the task inline on the first thread in response to determining that the current stack pointer and the previous stack pointer indicate that the inline execution will not cause the stack to overflow.

10. The method of claim 9 further comprising:

executing the task inline on the first thread in response to determining that the inline counter indicates that the inline execution will not cause the stack to overflow.

11. The method of claim 9 further comprising:

incrementing the inline counter in response to executing the task inline on the first thread.

12. The method of claim 9 further comprising:

decrementing the inline counter in response to the task returning from execution on the first thread.

13. A computer readable storage medium, which does not include transitory propagating signals, storing computer-executable instructions that, when executed by a computer system, perform a method comprising:

comparing an inline counter corresponding to a first thread to a first threshold in response to determining that inline execution of a task on the first thread is desired;

comparing a current stack pointer and a previous stack pointer that was determined to be safe in response to the inline counter exceeding the first threshold;

executing the task inline on the first thread in response to the inline counter being less than the first threshold; and incrementing the inline counter in response to executing the task inline on the first thread.

14. The computer readable storage medium of claim 13, the method further comprising:

executing the task inline on the first thread in response to the current stack pointer being above the previous stack pointer.

15. The computer readable storage medium of claim 14, the method further comprising:

in response to the current stack pointer being below the previous stack pointer, comparing the current stack pointer to a memory boundary of the stack; and executing the task inline on the first thread in response to an amount of memory space between the current stack pointer and the memory boundary exceeding a second threshold.

16. The computer readable storage medium of claim 15, the method further comprising:

storing the current stack pointer as a lowest known safe watermark in response to the amount of memory space exceeding the second threshold.

17. The computer readable storage medium of claim 16, the method further comprising:

in response to the amount of memory space not exceeding the second threshold, executing the task with a second thread.

* * * * *